United States Patent [19]
Harris

[11] Patent Number: 5,372,467
[45] Date of Patent: Dec. 13, 1994

[54] GRAIN CONVEYER AND SPREADER

[76] Inventor: Ecil J. Harris, P.O. Box 529, El Campo, Tex. 77437

[21] Appl. No.: 227,186

[22] Filed: Apr. 13, 1994

Related U.S. Application Data

[63] Continuation of Ser. No. 10,589, Jan. 28, 1993, abandoned.

[51] Int. Cl.$^5$ .............................................. B65G 65/30
[52] U.S. Cl. ...................................... 414/301; 414/299; 239/681
[58] Field of Search ................... 414/299-302, 414/195; 406/160, 162; 239/666, 668-669, 681-682

[56] References Cited

U.S. PATENT DOCUMENTS

| | | |
|---|---|---|
| 797,073 | 8/1905 | Perry . |
| 1,729,341 | 9/1929 | Johnson . |
| 2,652,288 | 9/1953 | Sands ................................. 406/162 |
| 2,687,892 | 8/1954 | Kinsella ............................. 414/301 |
| 3,817,408 | 6/1974 | Hanson . |
| 3,902,610 | 9/1975 | Sukup . |
| 3,989,194 | 11/1976 | Parker ................................ 239/666 |
| 4,040,529 | 8/1977 | Wurdeman et al. ............... 414/301 |
| 4,159,151 | 6/1979 | Wood ................................. 406/162 |
| 4,216,914 | 8/1980 | O'Hanlon ......................... 414/301 X |
| 4,272,028 | 6/1981 | Cobb ................................. 414/301 X |
| 4,342,532 | 8/1982 | Voegele ............................. 414/299 |
| 4,555,210 | 11/1985 | Wigram ............................. 414/301 |
| 4,564,328 | 1/1986 | Loutaty et al. ..................... 414/301 |
| 4,611,965 | 9/1986 | Dixon et al. ...................... 414/299 |
| 4,754,869 | 7/1988 | Hutchison et al. ............... 414/301 X |
| 4,902,185 | 2/1990 | Dixon et al. ...................... 414/301 |

FOREIGN PATENT DOCUMENTS 2233454  2/1973  Germany ............................ 414/301

Primary Examiner—Michael S. Huppert
Assistant Examiner—James W. Keenan
Attorney, Agent, or Firm—Jack W. Hayden

[57] ABSTRACT

A frame (27) supports a receiver chute (18) for conveying particulate solids to a rotatable conveyer chute (26) or (26a) that is configured to rotate as particulate solids are conveyed through the rotatable chute (26) or (26a) to rotate it and convey particulate solids to lateral chutes (50) for conveying the particulate solids in multiple streams throughout the interior of a tank to fill the tank without shoveling to spread the particulate solids and fill the tank.

5 Claims, 5 Drawing Sheets

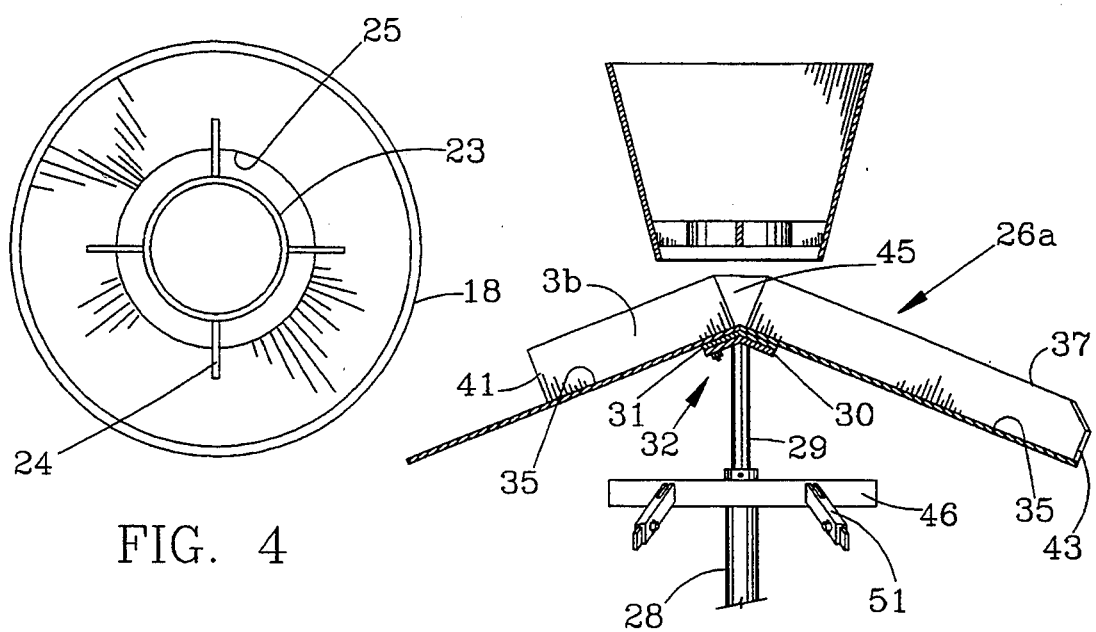
FIG. 4
FIG. 5
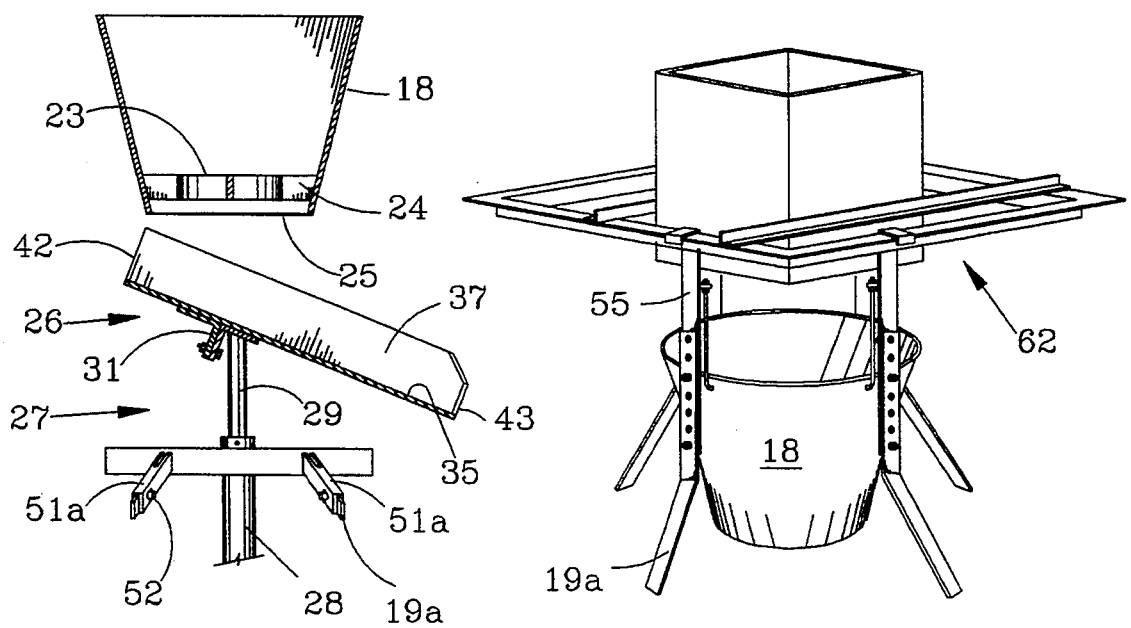
FIG. 6
FIG. 7

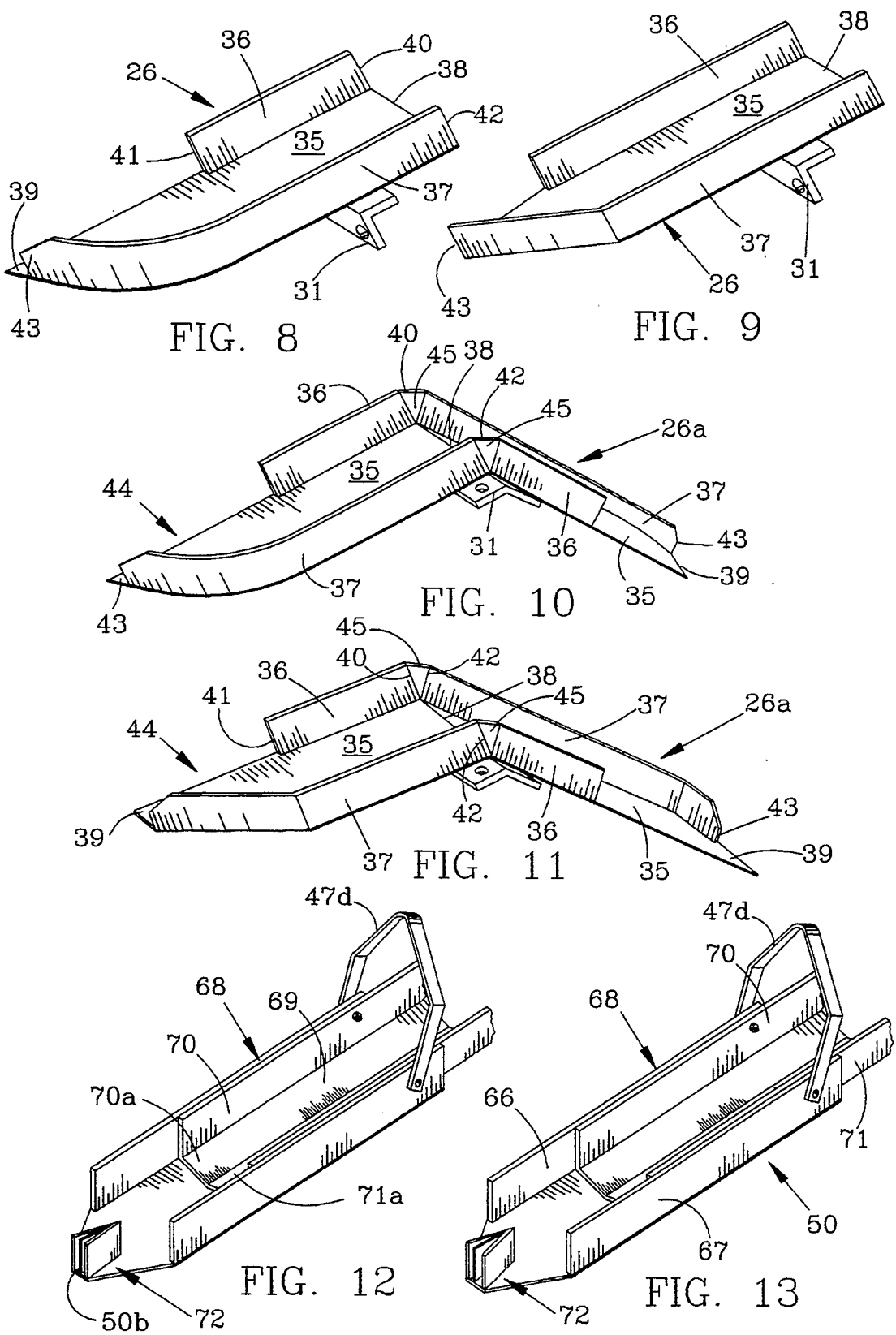

5,372,467

1

GRAIN CONVEYER AND SPREADER

This is a continuation of copending application Ser. No. 08/010,589 filed on Jan. 28, 1993, now abandoned.

STATEMENT OF THE PRIOR ART

Various types of motor actuated grain spreaders are available to distribute particulate solids, such as grain and the like in a storage bin. However motor actuated grain spreaders slow down with loads and interrupt operations by breakdowns.

Some self actuated grain spreaders have been proposed where the grain is discharged against an impeller such as a pitched blade to attempt to rotate the impeller and throw the grain in a manner to try to distribute it in a storage bin. This may damage the grain as the rotating blade hits the falling grain and does not necessarily eliminate the necessity of having one or more persons in the storage bin to shovel the discharged grain to assist in distributing it. The exposure of humans to grain dust in the concentration present in grain storage bins may cause substantial health hazards.

Also, the lighter particulate solids may not be spread and blended with the remaining particulate solids in a desired manner as they are discharged into the storage bin and impelled by the impeller.

SUMMARY OF THE INVENTION

One object of the present invention is to overcome the above and other problems with current devices for filling a tank, or storage bin, with particulate solids.

Another object is to provide a conveyer arrangement for conveying particulate solids, such as grain, into a storage bin in a manner to blend the light and heavier particles and spread them as they are conveyed and then discharged into a storage bin, or tank by conveyers as opposed to indiscriminate impelling or moving the particles as they are discharged into the tank A still further object is to provide a conveying arrangement for blending and spreading particulate solids, such as grain and the like, in a storage bin or tank, which avoids the use of a stirrer device, but does not interfere with the use of a stirrer device.

The present invention provides an apparatus and method for conveying particulate solids, such as grain, into a storage bin in a manner so that damage to the grain is inhibited and conveying and distributing the grain in a manner to eliminate the necessity of having anyone in the storage bin to assist in the distribution of the grain.

Other objects and advantages of the invention will become apparent from a consideration of the following description and drawings.

BRIEF DESCRIPTION OF THE DRAWINGS

FIG. 4 is a top view of the grain receiver chute;

FIG. 5 is a sectional view of a receiver chute and a double rotatable conveyer chute on a support frame;

FIG. 6 is a sectional view similar to FIG. 5 showing a receiver chute and a single rotatable conveyer chute on the support frame;

FIG. 7 is a perspective view of an adapter for use with the device of the present invention;

FIG. 8 is a perspective view of one form of a single rotatable conveyer chute;

FIG. 9 is a perspective view of another form of a single rotatable conveyer chute;

FIG. 10 is a perspective view of a form of a double rotatable conveyer chute;

FIG. 11 is a perspective view of another form of a double rotatable conveyer chute;

FIG. 12 is a partial perspective view of a form of a lateral chute and one form of a grain stream splitter;

FIG. 13 is a partial perspective view of a form of the lateral chute of FIG. 13 with the grain stream splitter expanded;

DESCRIPTION OF THE PREFERRED EMBODIMENTS

Figure 1:
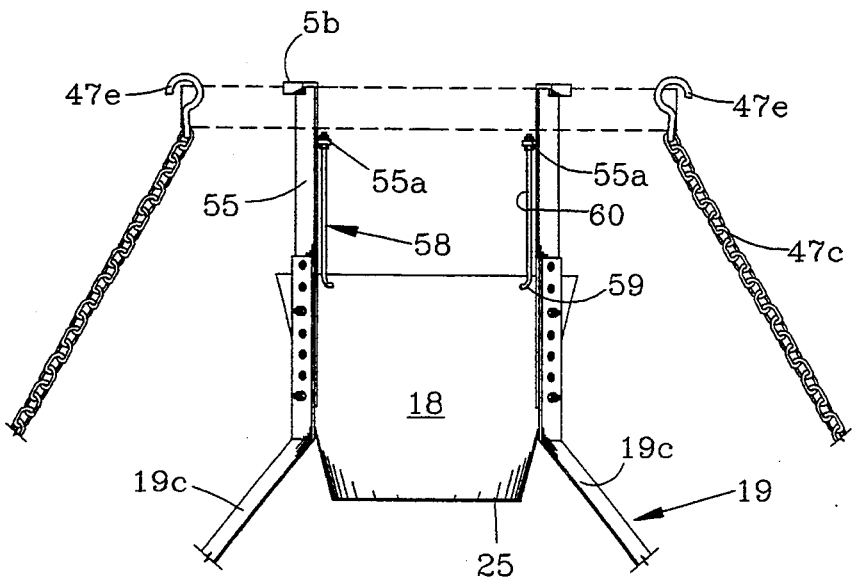
FIG. 1 is a view of a preferred form of a receiver chute supported in a storage bin, or tank top opening by legs and also showing the adjustable supports for lateral spreader chutes shown in FIG. 1A.
Figure 2:
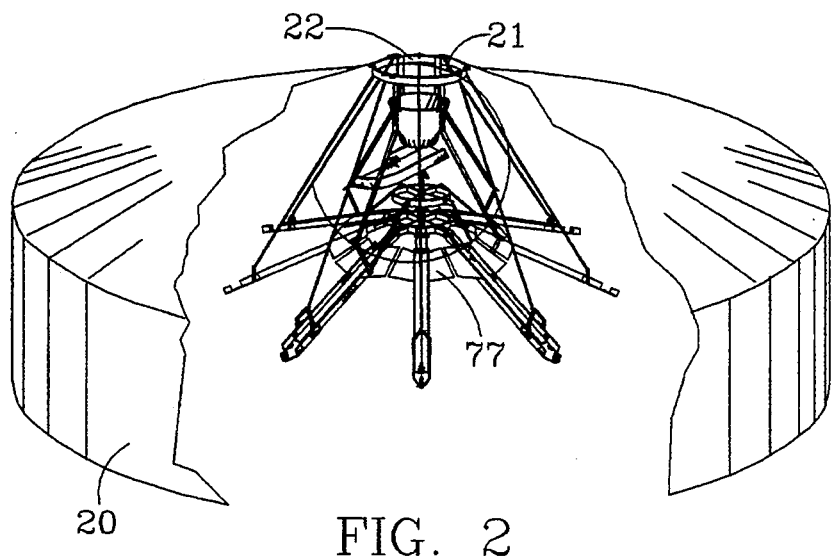
FIG. 2 is a view similar to FIG. 1B showing the assembled device supported on the rim of an opening in the top of a tank.
Figure 3:
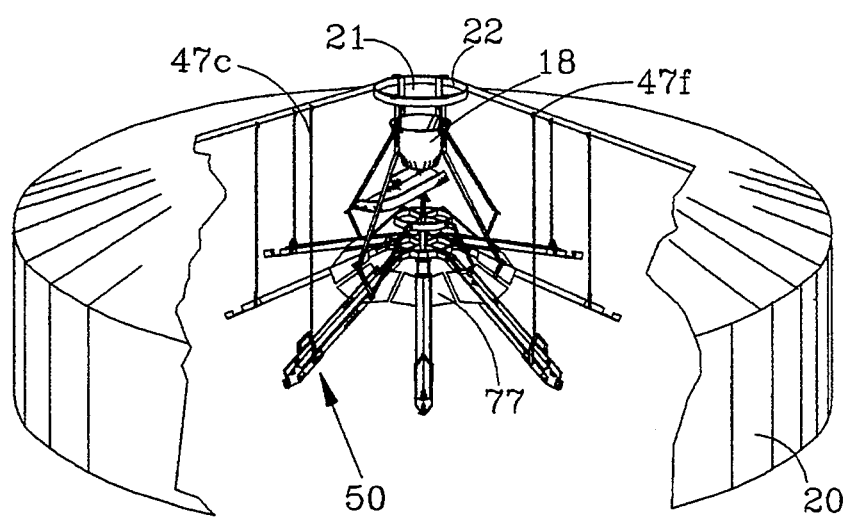
FIG. 3 is a view similar to FIG. 2 with the lateral spreader chutes supported from the storage bin.
Figure 14:
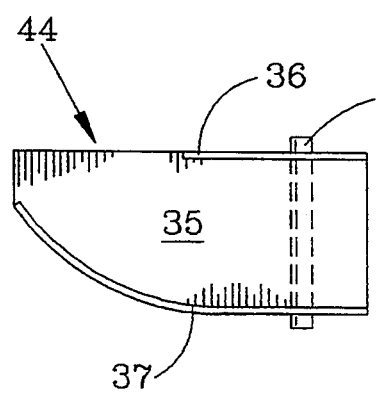
FIG. 14 is a top view of the single rotatable conveyer shown in FIG. 8.
Figure 15:
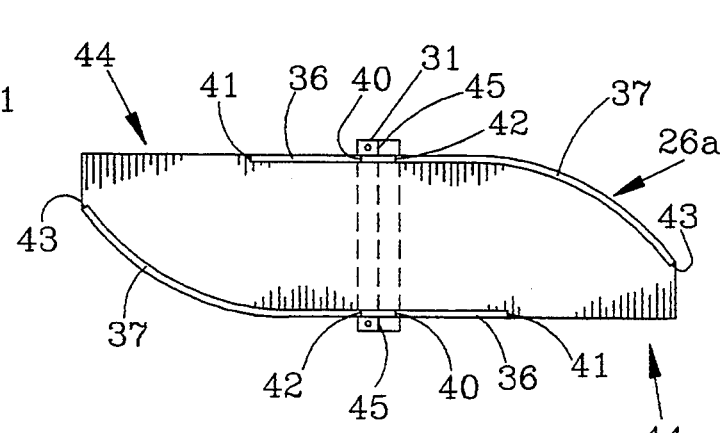
FIG. 15 is a top view of the double rotatable conveyer shown in FIG. 10.

Attention is first directed to FIG. 1 wherein a receiver chute 18 is supported, or connected, by legs referred to generally at 19 to position the receiver chute inside a tank beneath and aligned with an opening in the top of a tank, or storage bin 20 to receive particulate solids, such as grain or like, discharged into the tank 20 through the opening 21 in the top of the tank 20. As shown in FIGS. 1,2 and 3, the legs 19 are secured with the rim 22 forming part of the tank top surface surrounding the top opening 21. The receiver chute 18 is preferably cone shaped as illustrated, and may include a discharge stabilizer member 23, which is shown as annular, and secured in the receiver chute 18 by spacers 24. The stabilizer member may assume other configurations such as rectangular or square form. Its center axis is preferably aligned with the center axis of the discharge opening 25 of the receiver chute 18.

A rotatable conveyer chute referred to generally at 26 is rotatably supported by support frame 27, and is shown as a single rotatable chute. If desired, the rotatable chute may be a double rotatable chute, as generally referred to at 26a, illustrated in FIGS. 5, 10, 11 and 15.

The rotatable chutes 26, 26a each include a longitudinally extending bottom surface 35 with first and second sides 36 and 37, respectively, extending upwardly from the bottom surface 35. The bottom surface 35 of each the single or double form of the rotatable chute 26, or 26a has an upper end 38 and a lower end 39. The first side 36 of each the single or double rotatable chute has an upper end 40 and a lower end 41 and the second side 37 of each the single or double rotatable chute has an upper end 42 and a lower end 43.

The first side 36 extends longitudinally along one edge of the bottom surface 35 and terminates in longitudinal spaced relation to the lower end of the bottom surface 35, and as shown in the drawings, the longitudinal extent of the first side may vary.

The second side 37 of each rotatable chute extends along said bottom surface 35 and toward the first side 36 as shown in the drawings and its longitudinal extent may also vary. The second side 37 terminates below and in longitudinal spaced relationship to said first side lower end 41 as illustrated in the drawings which provides a discharge opening, referred to generally at 44 in the drawings, from the rotatable conveyer chute 26 or 26a for discharging grain and particulate solids to lateral conveyer and spreader chutes referred to generally at 50.

The rotatable double chute 26a is formed by connecting the bottom surfaces 35 of a pair of single rotatable chutes 26 together along their upper ends 38 to form a continuous surface, and by securing a piece of suitably configured material, as represented at 45, to fill the space in between the upper ends 40 of each first side 36 and the upper ends 42 of each second side 37 of the two single rotatable chutes 26 as shown in FIGS. 5, 10, 11 and 15. An apex 32 is formed at the juncture of the of the two upper ends 38 of the bottom surfaces of the two rotatable conveyer chutes.

The frame 27 includes tubular member 28 provided with bearings in any well known manner to rotatably support shaft 29 which is rotatable supported therein. Shaft 29 extends upwardly from the tubular member 28 and is connected at its upper end to the rotatable conveyer chute, referred to generally at 26 and 26a, respectively in FIGS. 1 and 5. The upper end of shaft 29 in both the single and double rotatable chute form has an angle iron 30 extending laterally of the shaft 29 as illustrated in the drawings and secured thereon in any suitable manner, such as by welding. The rotatable conveyer chute 26 or 26a has an angle iron 31 extending laterally and connected to the bottom of the conveyer chute 26 or 26a in any suitable manner such as by welding.

The abutting surfaces of the angle irons 30 and 31 are removably secured together by any suitable well known means such as nuts and bolts as shown in the drawings. The foregoing enables the rotatable chute 26 or 26a to rotate in a level horizontal plane, and enables the rotatable chute to be readily positioned on the shaft 29 and removed therefrom.

Where the rotatable chute is a double rotatable chute 26a as shown in FIGS. 10 and 11 the angle iron 30 is connected to both upper ends of the single rotatable chutes 26, 26a at the apex, referred to generally at 32, of the rotatable chutes formed by the joinder of the upper ends 38 of each of the bottom surfaces 35 of the rotatable conveyer chutes 26 and 26a.

The tubular member 28 of frame 27 includes longitudinally spaced members 46 and 47 which may assume any configuration and are shown as circular with suitable spokes 48 secured to member 28 and with each member 46 and 47, respectively, as shown in the drawings to secure the members 46 and 47 in position on the member 28 of frame 27.

The support legs 19 may be any suitable number and four are shown. They are each pivotally connected to member 46, but the amount of pivoting movement is limited. Inverted U shaped brackets 51 are mounted on member 46 to extend downwardly and outwardly therefrom. Each support leg 19 includes a support leg portion 19a that is pivotally connected in bracket 51 by a pin or a nut and bolt represented at 52 so that legs 19 may hang down until they are connected with the hanger bracket as will be explained. The extent of the upward movement of leg portion 19a is limited by contact with base 51a of inverted bracket 51.

The support leg portion 19a extends downwardly at an angle, as shown in the drawings, when the present invention is hung in a tank for use. Leg portion 19b is pivotally connected at the outer lower end of leg portion 19c and extends upwardly therefrom, when the device of the present invention is hung in a tank for use as shown in the drawings. The upper end of leg portion 19b is secured to upwardly extending leg portion 19c.

A hanger bracket 55 is bolted or otherwise secured adjacent the upper end of each of leg portions 19c as shown in the drawings. The upper end of the hanger brackets are bent or otherwise formed to provide a surface suitably shaped to releasably secure or engage with some portion of the storage bin, such as the rim 22 of a top opening in a tank in which the device is to be used as shown in FIG. 2 of the drawings.

Receiver chute J hooks 58 are releasably engaged with openings 59 in the receiver chute 18 and the upper end of each shaft 60 of the hooks 58 is extended through an opening in each projection 55a that extends from each of the hanger brackets 55. The upper end portion of each shaft 60 is threaded and a nut is threadedly engaged on the shaft 60 to abut the bottom surface of projection 55a as shown in the drawings. The threaded end portion of the shaft 60 extends through the opening in the projection 55a, and a nut is threadedly engaged therewith and abuts the top surface of the projection 55a as shown in the drawings to releasably lock the receiver chute 18 with the support legs 19 and in position to receive particulate material, such as grain and the like there through. When legs 19 supported on frame 27 are not in use to support the device in a tank, they hang down from bracket 51.

Where the storage bin does not have a top opening and the particulate material is discharged into the storage bin or tank by conveyors or spouted from elevators in a manner well known in the art, an adapter referred to generally at 62 in FIG. 7 may be secured in the top of the tank, and the present invention may be supported thereon as illustrated in FIG. 7.

Any desired number of lateral spreader chutes referred to generally at 50 may be provided and 8 are shown in the drawings. Each lateral chute is provided with an upper end 50a and a lower end 50b, a longitudinally extending bottom surface 65 and longitudinally extending side surfaces 66 and 67 extending upwardly along the edges of bottom surface 65.

The upper end of the lateral chutes is provided with spaced projections 63, 64 which are pivotally connected by any suitable means such as a pin or nut and bolt to the projections 47a extending from member 47 on the frame 27. Any suitable arrangement may be employed for pivotally connecting said lateral conveying and spreader chutes with the member 47.

This pivotal arrangement enables the chutes to be adjusted and maintained in any desired angle relative to frame 27. The adjustable means to secure the lateral chutes in any desired angle is shown as being chains 47c which are connected at their lower ends with suitable means such as S hooks 47e which hooks may be deformed to secure one end of the hook with the chain and the other end of the S hook is releasably engaged to a strap 47d which strap is pivotally connected to the sides of the lateral chutes adjacent their lower ends. The position of the strap 47d relative to the lower end of lateral chutes 50 may be adjusted as desired.

The upper end of the chains 47c are connected with the rim 22 of the top tank opening by suitable means such as S hooks 47e on the upper ends of the chains, as shown in FIG. 2 or may be connected to other parts of the tank such as ribs 47f on the inner surface of the tank top as shown in FIG. 3. The end of the S hook that is connected with the chain may be deformed sufficiently to inhibit separation of the hook from the chain.

In the form of the lateral chute shown in the drawings, each includes a liner, referred to generally at 68 forming part of the lateral spreader chute. The longitudinal extent of the liner in the lateral chute may vary as desired.

The bottom surface 69 of the liner is formed by sloping sides 70a and 71a which extend downwardly and inwardly from liner sides 70 and 71 to form a generally V shaped bottom surface.

The overall length of the lateral chutes will depend upon the inner diameter of the tank in which they are to be used. For example only, and not by way of limitation, lateral chutes having a length of approximately five feet and a width of approximately 7 inches have been found to function satisfactorily for a tank having an internal diameter of thirty feet. It is not desirable to discharge grain into a tank so fast that it tends to pack, and it is desirable that the grain fall gently into the storage bin or tank. This can be controlled to some extent by the angle that the lateral chutes are supported in the tank. By way of example only and not by way of limitation, it has been found that when the lateral chutes are supported at approximately a thirty degree angle, packing of the grain in the tank as it is discharged into the tank is generally avoided. The angle of the lateral chute to avoid packing of the grain may depend upon the tank size and length of lateral chute.

A splitter surface referred to generally at 72 may be supported adjacent the lower end 50b of the lateral chutes 50 when it is desired to split the particulate solids stream into two separate streams prior to discharge from the lateral chutes.

The grain splitter, in the preferred form shown includes a central support surface or plate 73 secured in vertical position to the bottom surface 65 of the lateral chute 50. A pair of flexible metal strips 74 and 75, or other suitable material are secured to the support 73 in any suitable manner and may be secured along the rear vertical edge 76 of plate 73 by welding or the like.

The members 74 and 75 may be bent outwardly and away from support plate 73, as desired to assist, in spreading and distributing the grain discharged from the lateral chutes. The fiat bottom surface of the lateral chute 50 preferably extends longitudinally beyond the V shaped liner bottom and the splitter surface is preferably spaced slightly beyond the lower end of the lateral chute sides 66 and 67 and mounted on the fiat bottom surface of the lateral chute as shown in the drawings. This enables the grain to spread out from the V shaped bottom of the liner prior to contact with the splitter to be divided into two flow streams.

Figure 1A:
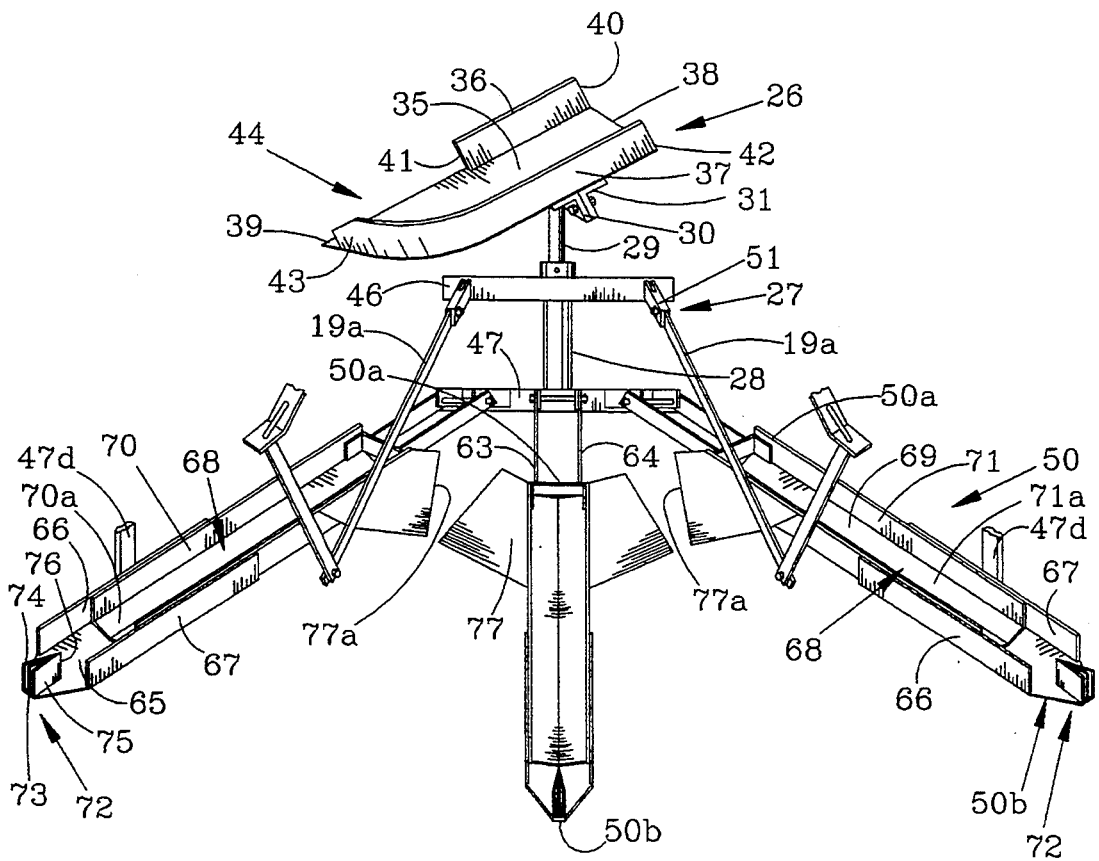
FIG. 1A is a view showing one form of a single rotatable conveyor chute supported on a frame, said frame supporting lateral spreader chutes for receiving grain from the receiver chute of FIG. 1 and legs which connect with the receiver chute to support it in a tank or storage bin.
Figure 1B:
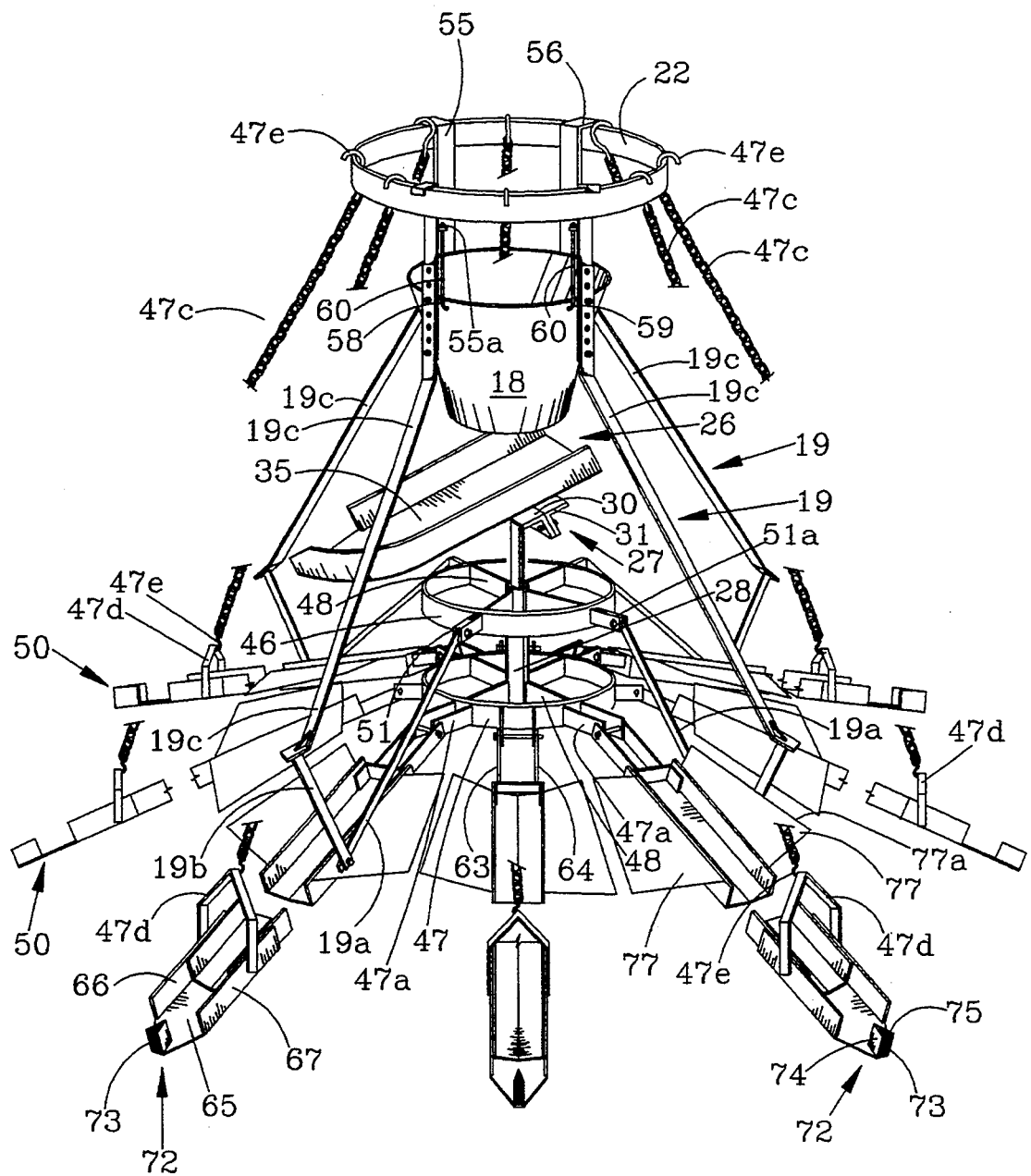
FIG. 1B is a perspective view showing the same components illustrated in FIGS. 1 and 1A in assembled position and supported by the tank surface surrounding a tank top opening, with a modified form of the lateral spreader chutes.

The lateral conveyor chutes are also preferably provided with collectors 77 secured to and extending laterally from each side of the lateral spreader chutes 50 as shown in the drawings. The collectors 77 may be of any suitable configuration to extend longitudinally along the lateral chutes, and in FIG. 1A, they are shown as right triangular surfaces extending from adjacent the upper end 50a of the lateral chute and longitudinally along the lateral chutes a relatively short extent.

It is preferable that the collectors extend or slope upwardly from the sides of the lateral chutes at any suitable angle, by way of example only, approximately twenty degrees so that particulate solids falling thereon will freely slide into the lateral chutes. It is also desirable that the outer longitudinal adjacent edges 77a of the collectors be spaced apart as shown in the drawings so that particulates discharged from the receiving chute discharge opening 25 will fall therebetween to fill the central portion of the tank beneath the device.

The device may be assembled in a tank which has a top opening and in which no stirrer is used by taking all components through the manhole adjacent the bottom of the tank and then assembled. The assembled device is then lifted by any suitable means so that the brackets 55 may be hung on the rim 22 on the tank top surrounding the tank top opening. The lateral spreader chutes may be lifted by chains 47c and the S hook on each chain engaged with the rim 22 to support the lateral spreader chutes at the desired angle. The receiver chute which is connected to the legs 19 should be checked to be sure it is horizontal and vertically aligned so that its discharge opening 25 will discharge onto the the bottom surface 35 of the rotatable chute 26 or 26a as it rotates.

When the device is installed in a tank with a top opening, in which a stirrer is used, the tank may be filled with grain and boards or the like placed thereon, if desired to form a working surface or rigging with a surface thereon provided in the tank to form a working surface. These type tanks normally have a manhole adjacent the edge of the top of the tank, and all the components may be brought into the tank and assembled, or some assembled and then brought into the tank. The assembled device is then lifted into position and supported adjacent the tank top opening by the hanger brackets 55 and the chains 47c as above described.

Where the device is used with a tank that is filled by conveyers or spouted from elevators, an adapter, one form of which is shown at 62 may be mounted in the tank in a well known manner and the present device then hung on the adapter generally as shown in FIG. 7.

The foregoing description of the invention is illustrative and explanatory thereof, and various changes in the details of the illustrated construction may be made without departing from the spirit of the invention.

What is claimed is:

1. A conveyer chute arrangement to spread particulate solids in a storage bin, said conveyer chute arrangement including:
   a receiver chute for securing adjacent a storage bin opening to assist in conveying particulate solids into the storage bin;
   a rotatable conveyer chute for aligning beneath said receiver chute to receive particulate solids from the receiver chute;
   a support for rotatably supporting said rotatable conveyer chute in the storage bin, said support including a rotatable shaft extending upwardly from said support, said rotatable shaft terminating in an upper end that is below said receiver chute for supporting said rotatable conveyer chute in alignment with said receiver chute as said rotatable conveyer chute rotates independently of said receiver chute;

said rotatable conveyer chute including:

a bottom surface extending longitudinally of said rotatable conveyer chute with first and second sides extending upwardly from said bottom surface;

said bottom surface having an upper end and a lower end;

said first side having an upper end and a lower end;

said second side having an upper end and a lower end;

said first side extending along said bottom surface with said lower end of said first side terminating in longitudinal spaced relation to said bottom surface lower end;

said second side extending along said bottom surface and toward said first side with said lower end of said second side terminating below and in longitudinal spaced relationship to said first side lower end for providing a discharge opening for discharge of the particulate solids from said rotatable conveyer chute to cause rotation of said rotatable conveyer chute as particulate solids are conveyed toward and through the discharge opening for discharge from said rotatable conveyer chute; and circumferentially spaced, laterally extending chutes pivotally secured to said support below and longitudinally spaced from said rotatable conveyer chute, said laterally extending chutes receiving the particulate solids discharged from the rotatable conveyer chute as it rotates to spread the particulate solids in the storage bin.

2. The conveyer chute arrangement of claim 1 wherein said second side that extends toward said first side is arcuate.

3. The conveyer chute arrangement of claim 1 wherein said second side that extends toward said first side is diagonal.

4. The conveyer chute arrangement of claim 1, or claim 2, or claim 3 wherein said rotatable conveyer chute is formed by two rotatable conveyer chutes connected together to form an inverted V shaped rotatable conveyer chute.

5. A conveying device for securing within a storage bin to convey and spread particulate solids for filling the storage bin including:

a receiver chute to receive the particulate solids therethrough;

a rotatable conveyer chute having a flat bottom surface for aligning beneath said receiver chute;

said rotatable conveyer chute having surfaces which cooperate with said bottom surface to effect rotation of said rotatable conveyer chute by the particulate solids conveyed through said rotatable conveyer chute;

a support for supporting said rotatable conveyer chute in the storage bin, said support including a rotatable shaft extending upwardly from said support, said rotatable shaft terminating in an upper end that is longitudinally spaced from and beneath said receiving chute for supporting said rotatable conveyer chute in alignment with said receiving chute as said rotatable conveyer chute rotates independently of said receiving chute;

stationary conveyer chutes pivotally secured to said support beneath said rotatable conveyer chute and extending laterally relative to said rotatable conveyer chute to receive particulate solids therefrom for discharge to the storage bin;

said stationary conveyer chutes having a bottom surface with sides extending upwardly from said bottom surface;

said bottom surface of said stationary conveyer chutes formed by sloping surfaces extending downwardly and inwardly from said sides;

said bottom surface of said stationary chutes having an upper end and a lower end;

said upwardly sides of said stationary chutes having an upper end adjacent said upper end of said bottom surface and a lower end adjacent said lower end of said bottom surface;

a splitter surface between said upwardly extending sides;

said bottom surface lower end including a flat portion which extends beyond said lower end of said sides with said splitter surface thereon;

said splitter surface including members supported on and extending upwardly from said flat portion of said bottom surface end;

said members connected along one vertical edge to provide a generally V shape with the apex of the V shape facing toward said upper end of said bottom surface; and said members movably supported relative to said stationary chute's bottom surface to vary the width of the V shape.

* * * * *